Jan. 1, 1963  H. ST. PIERRE  3,071,109
POULTRY-HOUSE AUTOMATIC CLEANER
Filed Nov. 13, 1958  2 Sheets-Sheet 1

INVENTOR
HENRY ST. PIERRE by Charles R. Fay

ATTORNEY

Jan. 1, 1963  H. ST. PIERRE  3,071,109
POULTRY-HOUSE AUTOMATIC CLEANER
Filed Nov. 13, 1958  2 Sheets-Sheet 2
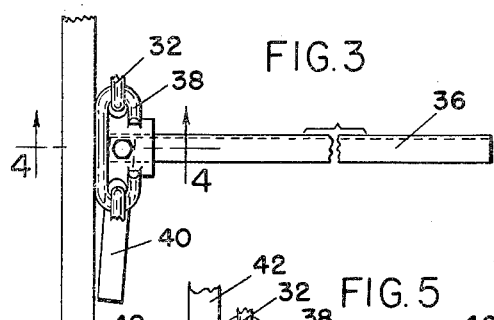
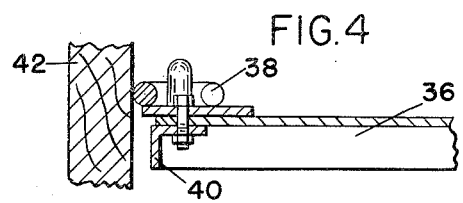
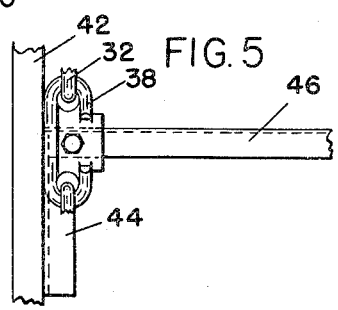
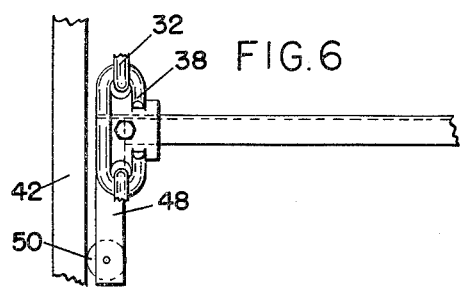
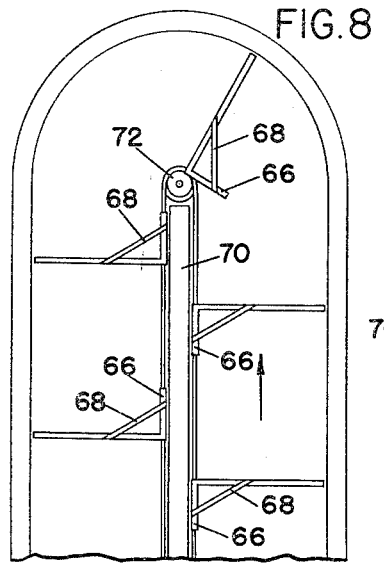
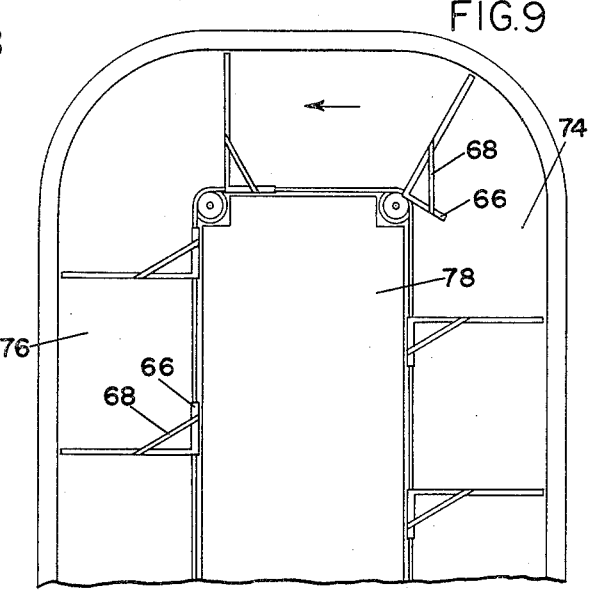
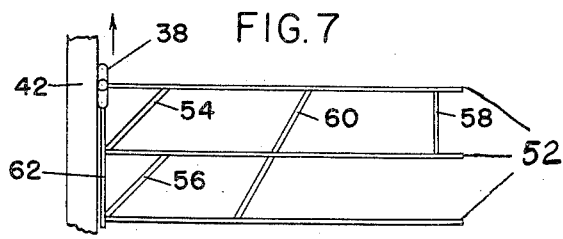
INVENTOR
HENRY ST. PIERRE
*by Charles R. Jay*
ATTORNEY United States Patent Office 3,071,109
Patented Jan. 1, 1963

3,071,109
POULTRY-HOUSE AUTOMATIC CLEANER
Henry St. Pierre, 50 Frank St., Worcester, Mass.
Filed Nov. 13, 1958, Ser. No. 773,622
3 Claims. (Cl. 119—22)

This invention relates to a new and improved poultry-house and particularly to manure-cleaners therefor, the principal object of the invention residing in the provision of a power-operated automatic manure cleaner for cleaning out practically all of the droppings of the poultry at all times, whether the poultry is roosting or feeding.

One of the principal objects of the invention resides in the provision of a new and improved endless chain-operated cleaning member which is adapted to extend in a double run, said runs being parallel and closely adjacent each other underneath the entire areas of the roosting screens and feeding stations for the poultry, the droppings from the poultry going through the screen and into the areas swept by the cleats actuated by the endless chain, to the end that substantially all of the poultry manure is swept away to some pre-arranged delivery point.

A further object of the invention includes the provision of a poultry-house and an automatic cleaner therefor comprising a framework, said framework providing a roost and feeding floor slightly above a sub-flooring and including a chain-operated series of flights or cleats moving in an endless circuit, said circuit comprising two main runs which are generally parallel and together provide for clearing an area six feet wide which is the usual width of a poultry run, said framework, roost and screen providing for a watertrough and a pair of feed troughs which are situated above the roosting screen for the poultry, the nesting laying boxes being arranged at the sides thereof, so that manure or droppings fall through the screen to a degree of about 99%, onto the sub-flooring which is swept clean by the flights or cleats; and the provision of a poultry-house as above stated including doors arranged at the sides of the runs of the cleaning device to provide access for the purposes of repair, washing, etc., said doors being normally closed and including means for holding down the free ends of the cleats, the chain being conveniently mounted on a center partition or the like extending between the sub-flooring and the roosting floor, and the cleats extending outwards to the sides of the poultry run.

Other objects and advantages of the invention will appear hereinafter.

Reference is to be had to the accompanying drawings, in which

FIG. 3 is a plan view on an enlarged scale illustrating a form of the flight;

FIG. 4 is a section on line 4—4 of FIG. 3 on an enlarged scale;

FIGS. 5, 6 and 7 are plan views illustrating different forms of flights which may be used in this invention;

FIG. 8 is a diagrammatic view illustrating the appearance and action of the flight in travelling on the path indicating the construction of FIGS. 1 and 2; and FIG. 9 is a similar view but showing a separated or widened arrangement where the two runs of the flights are separated.

In carrying out the present invention, there may be built first a sub-floor 10. This sub-floor 10 may be concrete, wood, or the like, or it may be already in existence in the poultry-house.

Figure 2:
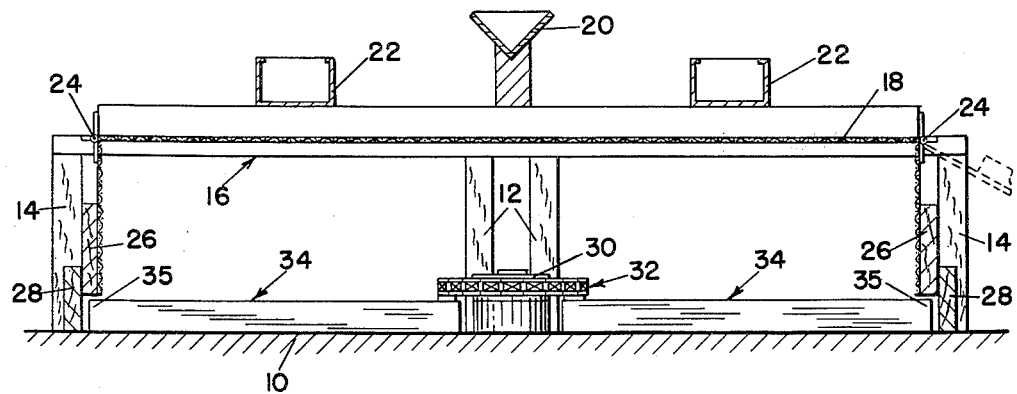
FIG. 2 is a section on an enlarged scale on line 2—2 of FIG. 1.

On this sub-floor there is arranged a framework which conveniently comprises an elongated center partition 12 and outside standards or the like 14. It is contemplated that the outside standards shall be six feet apart transversely of the machine as shown in FIG. 2, but of course this length is capable of variation.

Upon the standards 14 and partition 12 there is mounted a framework generally at 16 which may be of any usual or desired construction. This framework, however, provides a support for horizontal foraminous screening 18, this screening being in any form desired such as fine mesh chicken wire, expanded sheet metal, etc. In any event, this screening 18 provides a roosting floor for the poultry. This floor is very largely open and the poultry droppings of course fall therethrough to a substantially complete amount and in doing so of course, fall upon the surface of the sub-floor 10, the latter being co-extensive with the screen, i.e., with the entire poultry run.

Longitudinally centrally of the chicken run above described, there may be provided a watertrough 20 of usual construction and a pair of feed-boxes 22 which are also of known construction and may be automatically serviced by commercial feeding devices. In any event, the watertrough is positioned directly above the center partition 12 so that no droppings will fall in the area of the central partition 12.

The boxes in which the poultry lay the eggs are located at the sides of this run as is well known in the art and therefore it will be seen that substantially all poultry droppings will fall on the sub-flooring 10 within the areas between partition 12 and the outside standards 14 constituting a gutter.

Arranged on pivot-pins 24 there are provided pivoted doors 26 which may be opened from the sides upwardly as shown in dotted lines in FIG. 2 for repair, manual cleaning, etc., if this is desired or found to be necessary. In any event, the doors 26 are provided with offset portions 28 for a purpose to be described.

Figure 1:
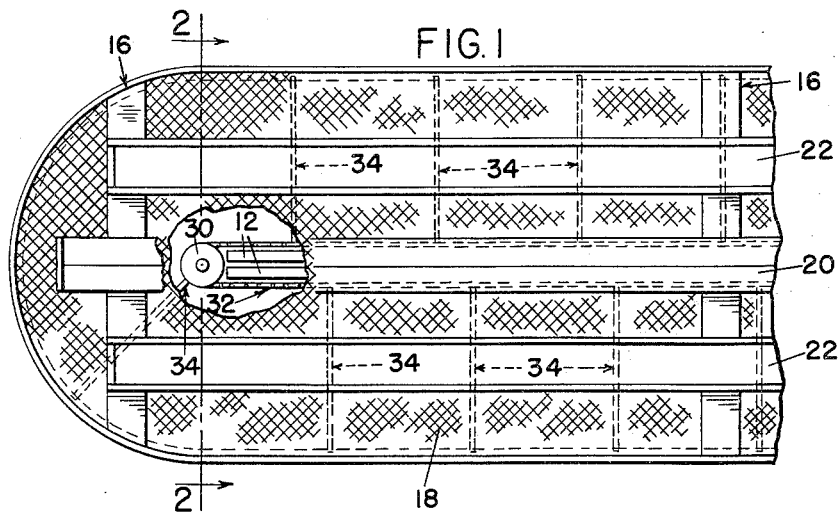
FIG. 1 is a partial plan view showing the invention.

The center partition 12 provides a guide and support for various sprocket wheels as may be necessary as at 30 in order to drive a chain indicated generally at 32. This chain extends in an extremely long narrow loop as is indicated in FIG. 1 and the sprocket 30 may be driven or idle, depending upon the convenient positioning of mounting an electric motor for driving the chain 32.

Attached to chain 32 at desired spaced intervals are a series of elongated cleats or flights generally indicated at 34. Each flight is secured by any desired or convenient means at one end thereof to chain 32, the opposite end being free but underlying the door 26 as at 35 occasioned by the offsets 28 above described. This provides a channel which holds down the free ends of the chains if they have any tendency to rise due to hardened detritus which may not have been swept off previously. The cleats sweep the entire area of the poultry run.

In FIG. 3, there is shown a form of flight attached to the chain as above described in which special provision is made for making the flight in a particularly elongated manner as for instance in the nature of six feet long rather than three feet long so as to provide cleaning means over a much larger area at a single sweep.

In FIG. 3 the flight itself is indicated at 36 and it is attached to the chain 32 by means of a special adapter 38. Attached to this flight there is a trailing substantially right angular member indicated at 40 and this may be in any form such as an angle-iron if desired as clearly shown in FIG. 4. This provides a means for preventing retraction or twisting of flight 36 as it moves along in its course to clean the floor or area wherein it is provided. This action is possible because of the wall 42 against which the trailing member 40 impinges. The tendency of flight 36 in FIG. 3 is to be twisted to the rear in a clockwise direction but by reason of member 40 impinging upon the upright wall 42, this action is held to a minimum so that the entire area is cleared to the full length of cleat 36.

It will be noted that in FIG. 3 the member 40 is not just at a right angle with respect to flight 36; but as shown in FIG. 5 the trailing member 44 may be located somewhat inwardly with respect to the end of flight 46 (equivalent to that at 36) for smoother sliding action against the wall 42. Also, as shown in FIG. 6, the trailing member 48 may be provided with a roller 50 to bear against the wall and other variations of this invention may of course be made without departing from the scope thereof.

In FIG. 7 there is shown a multiple flight which in this case includes three members indicated at 52 and these may be appropriately braced if necessary as for instance at 54, 56 and 58 and also as shown at 60. Many other forms may be utilized but in any case the member at 62 contacting wall 42 clearly prevents any rearward pivoting or dragging motion of the cleaning flights.

This is perhaps more clearly shown in FIGS. 8 and 9 which are diagrammatic. In FIG. 8 the flights are illustrated at 46 and the trailing end pieces at 66, the braces being shown at 68. The wall is indicated at 70. When the flights are travelled around the pulleys 72, the trailing end pieces 66 of course leave the wall and extend outwardly as shown, but the cleaning action of the flights takes place in the straight away runs thereof so that the cleaning action is still clearly present. No interference is possible between the trailing end pieces 66 and the chains or the pulleys.

This action is also shown as to a slightly different form of setup in FIG. 9 wherein the runs 74 and 76 are more widely separated by a structure generally indicated at 78 and forming a larger arrangement where it may be desired to provide some other means or devices in the area 78 not possible to be placed in the area of the wall 70 in FIG. 8.

It will be seen that this invention provides an automatic poultry-house cleaner which takes substantially all of the droppings and travels the same to a point of deposit, not shown. The average poultry run is six feet wide and this novel poultry-house cleaner takes care of the entire six feet of area and maintains the same in clean condition. The poultry cannot be injured in any way and the poultry-house is clearly capable of taking care of at least twice the usual number of poultry as provided in chicken houses not provided with this automatic floor cleaner, due to the fact that the floor on which the chickens roost and also feed is maintained substantially 100% clean at all times and the poultry may be huddled in together closer so that more poultry may be serviced in the same area than in the prior art.

The sub-floor may be very close to the screen with approximately a foot spacing vertically because the present cleaner is so efficient. Hence, the poultry-house may have more runs per unit of vertical height than in the prior art. Therefore, the poultry-house may accommodate a great many more of the chickens, both because there may be more per horizontal unit of space as well as more runs in the same vertical space.

Having thus described my invention and the advantages thereof, I do not wish to be limited to the details herein disclosed, otherwise than as set forth in the claims, but what I claim is:

1. A device of the class described comprising a gutter having a floor, an endless chain in the gutter, means for traveling the chain, a series of flights attached at their ends to the chain and extending at right angles thereto for clearing the gutter, the flights resting on the floor and being otherwise unsupported and extending from wall to wall of the gutter, a trailing end piece attached to each flight at a substantial right angle thereto in a trailing direction thereof, said trailing end piece being adapted to contact an upright wall of the gutter for the purpose of holding the flight out at a substantial right angle to the wall, and to prevent twisting or trailing of the free end of the flight.

2. The device recited in claim 1 including a series of spaced flights each attached to the same trailing end piece.

3. The device recited in claim 1 including a series of spaced flights each attached to the same trailing end piece, and appropriate bracing means between the respective flights on a single trailing end piece.

References Cited in the file of this patent

UNITED STATES PATENTS

| | | |
|---|---|---|
| 460,202 | Eberhardt | Sept. 29, 1891 |
| 1,125,597 | Roegner | Jan. 19, 1915 |
| 1,232,051 | Kuhn | July 3, 1917 |
| 1,821,678 | Snodgrass | Sept. 1, 1931 |
| 1,987,298 | Inman et al. | Jan. 8, 1935 |
| 2,096,356 | Fox | Oct. 19, 1937 |
| 2,275,009 | Danker | Mar. 3, 1942 |
| 2,373,765 | Lemmon | Apr. 17, 1945 |
| 2,460,894 | Martinovich | Feb. 8, 1949 |
| 2,554,589 | Patz | May 29, 1951 |